(12) United States Patent
Hicks (10) Patent No.: US 9,050,511 B2
(45) Date of Patent: Jun. 9, 2015

(54) DAMPING DEVICE (76) Inventor: David Raymond Hicks, Hampshire (GB)

(\*) Notice: Subject to any disclaimer, the term of this patent is extended or adjusted under 35 U.S.C. 154(b) by 151 days.

(21) Appl. No.: 13/808,715

(22) PCT Filed: Jul. 12, 2011

(86) PCT No.: PCT/GB2011/051304
§ 371 (c)(1),
(2), (4) Date: Jan. 7, 2013

(87) PCT Pub. No.: WO2012/007747
PCT Pub. Date: Jan. 19, 2012

(65) Prior Publication Data
US 2013/0109493 A1 May 2, 2013

(30) Foreign Application Priority Data

Jul. 12, 2010 (GB) .................................. 1011616.8
Jan. 26, 2011 (GB) .................................. 1101326.5
May 12, 2011 (GB) .................................. 1107915.9

(51) Int. Cl.
*A63B 53/10* (2006.01)
*A63B 53/12* (2006.01)
*A63B 53/00* (2006.01)
*F16F 7/00* (2006.01)
*A63B 57/00* (2006.01)
*A63B 59/00* (2006.01)

(52) U.S. Cl.
CPC ................. *A63B 53/10* (2013.01); *A63B 53/00* (2013.01); *A63B 53/007* (2013.01); *A63B 57/0087* (2013.01); *A63B 59/0062* (2013.01); *A63B 59/0092* (2013.01); *F16F 7/00* (2013.01); *Y10T 29/49826* (2015.01)

(58) Field of Classification Search
CPC .................................... A63B 53/10; F16F 7/00
USPC .................................................. 473/297, 318
See application file for complete search history.

(56) References Cited

U.S. PATENT DOCUMENTS

| 5,465,967 | A | | 11/1995 | Boeckenhaupt | |
|---|---|---|---|---|---|
| 5,478,075 | A | * | 12/1995 | Saia et al. | 473/238 |
| 5,575,722 | A | * | 11/1996 | Saia et al. | 473/300 |
| 5,653,643 | A | * | 8/1997 | Falone et al. | 473/300 |
| 5,655,975 | A | * | 8/1997 | Nashif | 473/316 |
| 5,683,308 | A | * | 11/1997 | Monette | 473/318 |
| 6,764,414 | B2 | * | 7/2004 | Kumamoto | 473/297 |
| 7,407,724 | B2 | * | 8/2008 | Coffey et al. | 429/164 |
| 7,494,423 | B2 | * | 2/2009 | Cheng | 473/318 |
| 7,500,921 | B2 | * | 3/2009 | Cheng | 473/318 |

(Continued)

FOREIGN PATENT DOCUMENTS

| GB | 434533 | 9/1935 |
|---|---|---|
| GB | 2378395 | 2/2003 |

(Continued)

*Primary Examiner* — Stephen Blau
(74) *Attorney, Agent, or Firm* — Ober, Kaler, Grimes & Shriver; Royal W. Craig (57) ABSTRACT

A golf club (2) comprising a shaft (20), a head and a damping device (1, 100). The damping device (1, 100) includes an anchor element (3, 103) and a damping element (4, 104) interconnected by a rigid rod (5, 105). The anchor element (3, 103) is anchored within the lower section of the shaft (20) that has a substantially constant diameter such that the damping element (4, 104) is in contact with an internal surface of the shaft (20) to dampen vibrations therein.

7 Claims, 8 Drawing Sheets

(56) References Cited

U.S. PATENT DOCUMENTS

| | | | |
|---|---|---|---|
| 7,699,718 B2* | 4/2010 | Lindner | 473/297 |
| 7,815,878 B1* | 10/2010 | Wheatley | 422/306 |
| 8,641,551 B2* | 2/2014 | Johnson | 473/297 |
| 2003/0006046 A1* | 1/2003 | Kaimart | 169/26 |
| 2003/0022729 A1* | 1/2003 | Pergande et al. | 473/332 |
| 2004/0082402 A1* | 4/2004 | Unosawa | 473/316 |
| 2008/0274823 A1* | 11/2008 | Lindner | 473/297 |
| 2010/0105498 A1* | 4/2010 | Johnson | 473/318 |
| 2010/0143586 A1* | 6/2010 | Ide et al. | 427/240 |

FOREIGN PATENT DOCUMENTS

| | | | |
|---|---|---|---|
| JP | 02227474 A * | 9/1990 | C09D 133/00 |
| WO | WO9709094 | 3/1997 | |
| WO | WO9851378 | 11/1998 | |

\* cited by examiner

DAMPING DEVICE

FIELD OF THE INVENTION

This invention relates generally to a damping device, particularly for golf clubs. More specifically, although not exclusively, this invention relates to a damping device for a golf putter.

BACKGROUND OF THE INVENTION

It is known that the impact of a golf club hitting a golf ball causes vibrations through the shaft of the club. The frequency of these vibrations will generally indicate whether the ball has been struck using the correct portion of the club head, the so-called 'sweet spot', or whether contact has been made off the centre of the sweet spot. The frequency of the vibrations that result from an off-centre strike is generally unpleasant to the golfer and several attempts have been made to control and/or mitigate such frequencies through the use of damping devices.

A number of damping devices, for example that which is disclosed in EP0531233, were developed to be fitted to the exterior of the shaft of the golf club to dampen these vibrations. Later developments include shaft inserts that incorporate a damping material, for example those which are disclosed in U.S. Pat. No. 5,788,586 and WO0062873. However, none of these devices have been found to provide satisfactory results.

SUMMARY OF THE INVENTION

It is therefore a first non-exclusive object of the invention to provide a damping device that overcomes or at least mitigates the issues associated with known devices. It is a further non-exclusive object of the invention to provide a damping device that is particularly suited to the vibrations that occur in golf putters.

Accordingly, one aspect of the invention provides a damping device, e.g. for a golf club, the device comprising an anchor element and a damping element or frequency filter interconnected by a rigid rod, wherein the anchor element is configured to anchor, in use, the device within the shaft of a striking device such as a golf club, e.g. within a lower and/or constant diameter section of the shaft and/or at or adjacent the centre of gravity thereof, such that the damping element or frequency filter is in contact with an internal surface of the shaft to dampen vibrations, e.g. longitudinal and/or twisting vibrations, therein or thereof.

It will be appreciated by those skilled in the art that the provision of an anchor and damping element or frequency filter interconnected by a rigid rod improves the damping effect of the device. It will also be understood by those skilled in the art that the shaft of a golf club tapers for most of the length thereof except at the bottom of the shaft, e.g. adjacent the head of the club.

The anchor element is preferably configured to anchor or secure or fix, such as by an interference fit, the rod at or adjacent one of its ends, for example by an interference fit, e.g. to cantilever the rod. The damping element or frequency filter may be positioned at or adjacent one of the ends of the rod, e.g. the other end of the rod. In a preferred embodiment, the anchor element and the damping element are positioned at or adjacent opposite ends of the rod and/or the device has a recessed periphery between the anchor element and the damping element that is free of any contact with the shaft. The damping element or frequency filter may be resilient and/or may be configured to resiliently engage an internal surface of the shaft.

The anchor element and/or the damping element or frequency filter may comprise an enlarged portion, e.g. an enlarged end, of the rod, which may be removably connected or engaged or secured or fixed to or relative thereto.

The anchor element may comprise a sleeve or collar or collet that may be removable and/or receive a first end of the rod. The sleeve or collar or collet may comprise or be formed of a plastics material and/or may be split and/or expandable and/or may have or be filled with a resilient material such as an elastomer or elastomeric material (e.g. a urethane rubber), for example which material may enable repeated and/or resilient compression of the sleeve or collar or collet and/or which material may expand or urge, e.g. resiliently expand or urge, portions of the sleeve or collar or collet apart. A portion of the resilient material is preferably located between the portions of the split collet, for example to provide increased compression resistance and/or to retain the resilient material in place. In some embodiments, the resilient material is moulded or injected into the collet prior to curing.

The anchor element or sleeve or collar or collet may be fixed or secured to the rod, for example by a threaded engagement or adhesive or even moulded over the rod. In some embodiments, the sleeve or collar or collet extends beyond the end of the rod, for example to reduce the cantilever effect and/or to alter the rigidity with which the anchor secures and/or cantilevers the rod and/or to provide a further damping effect.

In other embodiments, the sleeve includes one or more, preferably two, o-rings that may be received or receivable into a groove, e.g. a respective groove, spaced from one another and/or adjacent one or each end thereof. Additionally or alternatively, the anchor element may comprise an adhesive, for example in the form of a double faced tape, to assist or improve the anchoring of the device, e.g. to fix the anchor element in place.

The damping element or frequency filter may also comprise a removable sleeve, which may be connected or engaged or secured or fixed to the rod by one or more o-rings or ferrules, for example between a pair of o-rings or ferrules, that may be secured to the rod or received within a groove, e.g. a respective groove, in or on the rod, e.g. abutting either end of the damping element or frequency filter or sleeve. The device may be provided with two or more different removable anchor elements and/or two or more different removable damping elements or frequency filters, for example to accommodate different club designs.

The device may further comprise a locking means or lock means or lock or fastener to lock or fasten or hold fast the anchor element to or relative to the rod. The lock or fastener may comprise a ball that may be received or receivable within, say, a transverse hole in the rod and/or an actuator, for example a threaded shaft or bolt or screw or grub screw that may be received or receivable within, say, an axial hole in the rod that may be threaded, e.g. that may intersect with the transverse hole. The actuator or threaded shaft or bolt or screw or grub screw preferably may include a tapered end, e.g. for urging the ball along the transverse hole, for example toward the anchor element or sleeve.

The damping element or frequency filter or sleeve may comprise a base sleeve and/or a resilient material or layer, for example a foam material or layer, e.g. over or wrapped around the base sleeve. In some embodiments, the damping element or frequency filter comprises a base sleeve with a spiral wrapped resilient material or strip. In some embodiments, the damping element or frequency filter comprises a resilient material or layer, for example a foam material or layer, that is mounted or secured or wrapped directly on or to or around the rod and/or covered by an outer layer or casing, for example encased in shrink wrap, e.g. to prevent damage or catching of the resilient material or layer when the device is installed or removed. The resilient material or layer may also be moulded onto or over the rod and/or may comprise formations or features, for example surface formations or features, e.g. to improve the damping effect. The resilient material is preferably selected to optimise the damping device's effectiveness.

The rod may comprise a recess or an undersized first end, for example on which the anchor element or sleeve or collar or collet is located or mounted or received.

Alternatively, the anchor element or sleeve or collar or collet may threadedly engage the rod, for example the rod may comprise an internal or external thread at or adjacent the or a first end with which a corresponding external or internal thread of the anchor element engages. The rod may further comprise a threaded second end, for example the end at or adjacent to which the damping element or frequency filter is secured.

The anchoring element may comprise a shore hardness, e.g. measured at the resilient material within the collet, of between 35 and 50, preferably 40 to 45. The damping element or frequency filter may comprise a shore hardness of between 40 and 55, preferably 45 to 50. It has been observed that this configuration provides surprisingly effective damping.

The damping device may further comprise an insertion or installation tool, e.g. with an end or a first end having an internal thread for cooperation with the threaded end of the rod and/or with an end or a second end having a handle. The damping device may also be provided with an optional damping extension that may include a first end configured for threaded engagement with the threaded second end of the rod of the damping device and/or a further damping element or frequency filter at or adjacent a second end thereof, which second end may be threaded. The further damping element or frequency filter may comprise any one or more of the aforementioned features of the damping element or frequency filter described above.

The insertion or installation tool may comprise a shaft part and/or a movable adaptor and/or a locator element. The shaft part may includes an elongate rod, for example with a first end carrying a handle and/or a second end with an internal thread, e.g. for cooperation with the or a threaded portion of the damping device or of the damping extension. The movable adaptor may include a locator knob and/or a hollow threaded body, for example with a collar at one of its ends. The locator knob may have a central hole with an internal thread that may cooperate with the thread of the body, e.g. for fine tune adjustment. The collar of the threaded body may includes a threaded hole that may receive a wing screw, for example for abutting and/or securing to the rod of the shaft part. The locator element may be substantially cuboid in shape and may have a channel along two opposed sides. A first channel may be configured to receive an outer portion of the shaft of a putter and/or the second channel may be configured to receive and/or locate the damping element or frequency filter.

The insertion tool may also be provided separately, as a further aspect of the invention.

The damping device may be configured such that the anchor element is adapted to anchor the rod in a lower portion of the shaft, e.g. a portion at, adjacent, above, below or adjacent the centre of gravity of the golf club, and/or such that the damping element or frequency filter is adapted to contact an upper portion of the shaft, e.g. a portion spaced or remote from the centre of gravity of the golf club, for example such that the rod spans the centre of the shaft. The rod is preferably configured to be absent of any portions that contact the shaft in use.

Another aspect of the invention provides a kit of parts for assembly into a damping device, e.g. a damping device as described above. The kit may comprise the or an anchor element and/or the or a damping element or frequency filter and/or the or a rigid rod and/or the or an insertion tool. The kit may further comprise two or more different removable anchor elements and/or two or more different removable damping elements or frequency filters, for example to accommodate different club designs. The kit may also comprise a brush, for example a cleaning brush, e.g. a 410 barrel cleaning brush, which may be useful for cleaning an internal surface of the shaft of a golf club in which the device is to be inserted, e.g. before insertion thereof. The kit may further comprise a container of grease, e.g. for facilitating insertion of the damping device.

A further aspect of the invention provides a golf club comprising a shaft, a head and a damping device as described above received or disposed within the shaft. Preferably, the anchor element of the damping device is located and/or anchored within a section, e.g. a lower of the shaft that has a substantially constant diameter and/or at or adjacent the centre of gravity of the golf club, e.g. such that the damping element or frequency filter is in contact with an internal surface of the shaft to dampen vibrations therein.

A yet further aspect of the invention provides a method of assembling a golf club according to the third aspect of the invention, the method comprising the steps of placing a damping device within the shaft of the golf club such that an anchor element thereof anchors the device to the shaft and such that the damping element or frequency filter is in contact with an internal surface of the shaft.

A yet further aspect of the invention provides a method of damping the vibrations in a striking device, e.g. a golf club, the method comprising the steps of anchoring a rigid rod within a first portion of a shaft of a striking device, e.g. a golf club, connecting a damping element or frequency filter to the free end of the rod such that it is in contact with a second portion of the shaft and striking a ball with the striking device or club such that vibrations in the shaft are damped by the damping element or frequency filter.

A yet further aspect of the invention provides a method of manufacturing a damping device, e.g. as described above. The method may comprise one or more of the following steps: providing a rigid rod and/or placing or mounting or moulding a collet, e.g. a split collet, onto or over the rod, e.g. at or adjacent a first end of the rod, and/or injecting a material into the collet, e.g. such that a portion of the material is located between the portions of the split collet, and/or curing the material to form a resilient material and/or placing or mounting or moulding a damping element onto or over the rod, e.g. at or adjacent a second end of the rod.

The anchor element is preferably positioned or anchored in a lower portion of the shaft, e.g. a portion at, adjacent, above, below or adjacent the centre of gravity of the golf club. The damping element or frequency filter preferably contacts an upper portion of the shaft, e.g. a portion spaced or remote from the centre of gravity of the golf club and/or an upper and/or non-constant diameter portion and/or tapered portion of the shaft. The rod preferably spans the centre of the shaft. The rod is preferably absent of any portions that contact the shaft. Positioning the anchor at or adjacent the centre of gravity with the damping element or frequency filter spaced therefrom is believed to provide optimum damping effectiveness, the reasons for which would be apparent to those skilled in the art.

The device may be configured and/or positioned to alter the overall weight and/or the distribution of weight of a golf club within which it is incorporated in use, for example the geometry and/or materials of the device may be designed or configured or selected to alter, e.g. to improve, in use, the characteristics and/or performance of the golf club. Advantageously, the device may be configured to increase, decrease or maintain substantially or not alter substantially the swing weight, for example to increase, decrease or maintain the swing sensitivity. Additionally or alternatively, two or more elements, parts or components of the device may comprise dissimilar materials, for example dissimilar metals, e.g. copper and/or brass and/or aluminium and/or a composite material and/or carbon fibre and/or iron and/or steel, wherein one of the elements, for example the anchor element, may be heavier or lighter than another element or part, for example the rod. Preferably, the anchor element is formed of a heavier material, e.g. brass and/or copper and/or iron and/or steel, than the rod, which may be formed of, say, aluminium.

The damping device may comprise a putter damping device and/or may comprise an insert, for example a putter damping insert. The golf club may comprise an iron or even a driver, e.g. provided the shaft is of a relevant configuration, but is preferably a putter.

BRIEF DESCRIPTION OF THE DRAWINGS

Embodiments of the invention will now be described by way of example only with reference to the accompanying drawings in which:

FIGS. 9 (a), (b) and (c) illustrate respectively the shaft, movable adaptor and an exploded view of the movable adaptor of the installation tool of FIG. 8.

DETAILED DESCRIPTION OF THE PREFERRED EMBODIMENTS

Referring now to FIGS. 1 to 4, there is shown a damping device 1 for incorporation into a golf club 2, which is a putter in this embodiment. The damping device 1 is an insert that includes an anchor element 3 and a damping element or frequency filter 4 that are interconnected by a rigid aluminium rod 5.

The anchor element 3 is in the form of a brass sleeve in this embodiment that is removably mounted to a first end of the rod 5 and that has a larger diameter than the rod 5. The anchor sleeve 3 includes a pair of spaced grooves 30 with an o-ring 31 received in each groove 30. The use of brass provides a relatively heavy component adjacent the head (not shown) of the putter 2. The device 1 is therefore configured to maintain the position of the centre of gravity of the putter 2 despite the addition of the damping device 1. In this embodiment, the device 1 is configured such that the overall weight, or dead weight, of the putter 2 is increased by approximately 100 grams, but the centre of gravity of the putter 2 is in the same position as it was prior to fitting the device 1.

The damping element 4 is also in the form of a composite sleeve in this embodiment that is removably mounted to the rod 5 adjacent a second end thereof and also has a larger diameter than the rod 5. The composite sleeve 4 includes a base sleeve 40 with a spiral wrapped foam layer 41 adhered thereto. The foam layer 41 is formed of a foam strip with a high bond self adhesive and an anti stretch mesh on one side thereof. The configuration of the foam layer 41 is selected to provide optimum damping, which is discussed in more detail below.

The rod 5 includes a recess 50 at its first end on which the anchor sleeve 3 is mounted and an externally threaded portion 51 at its second end for cooperation with an insertion tool (not shown). The rod 5 also includes a pair of grooves 52 adjacent the second end each of which receives a respective o-ring 53 for fastening the damping sleeve 4 therebetween. The rod 5 further includes a lock means to lock the anchor sleeve 3 to the rod 5. The lock means includes a ball 54 received within a transverse hole 55 in the rod 5 adjacent the first end and a grub screw 56 that engages an threaded axial hole 57 in the second end of the rod 5 and that intersects with the transverse hole 55. The grub screw 56 has a tapered end such that tightening of the grub screw 56 causes the ball to ride up the transverse hole 55 toward the anchor sleeve 3 to secure it in place.

Figure 1:
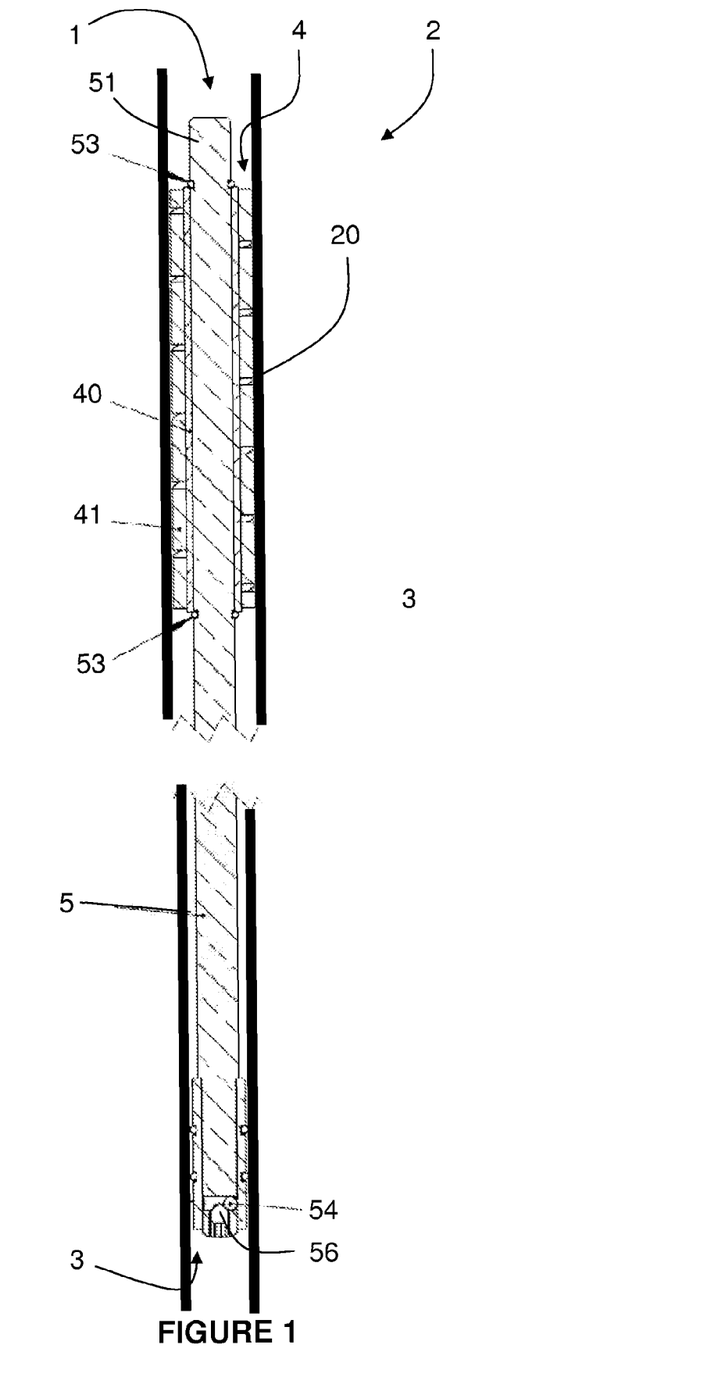
FIG. 1 is a partial section view of a putter that incorporates a damping device according to one embodiment of the invention.
Figure 2:
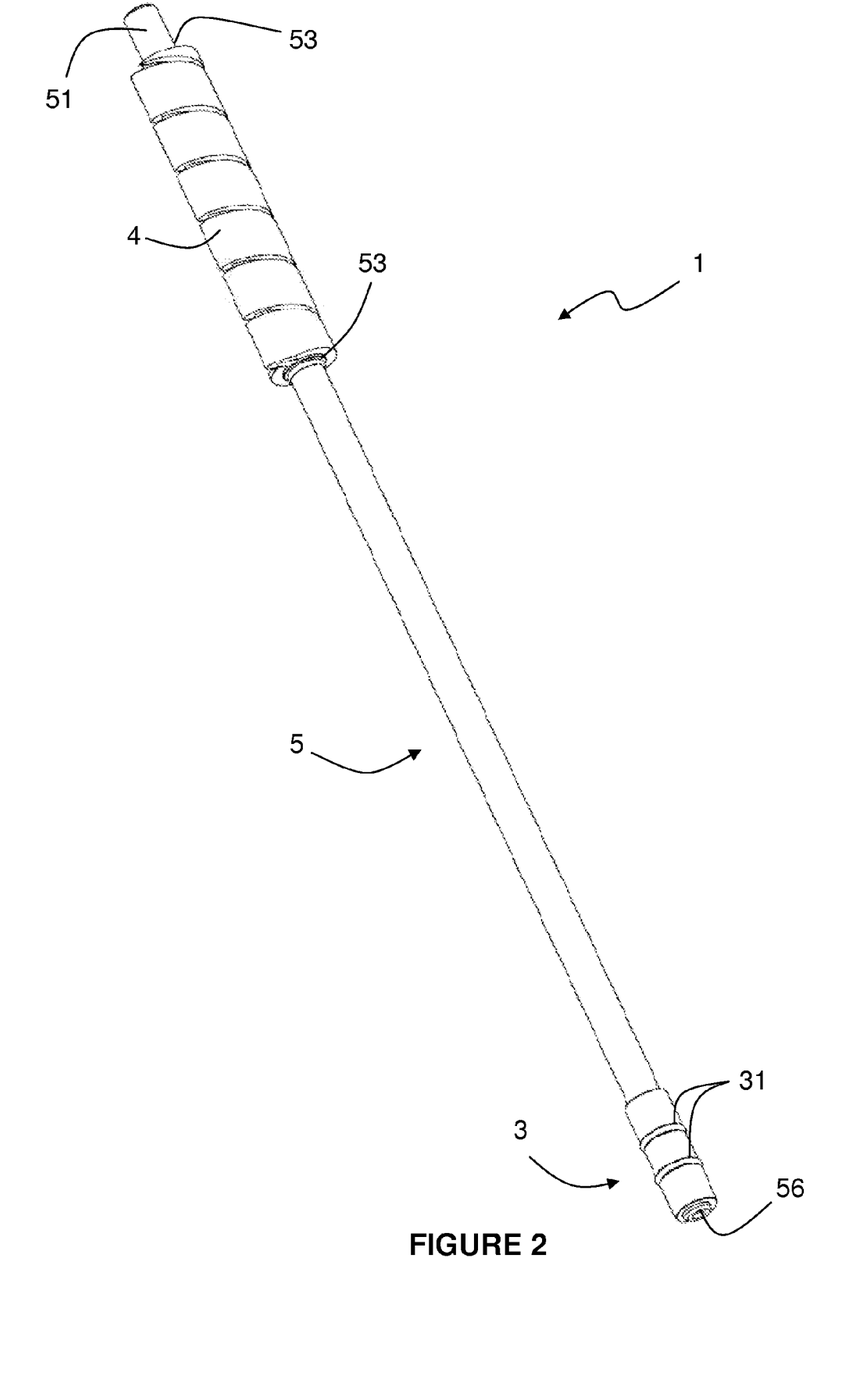
FIG. 2 is a perspective view of the damping device of FIG. 1.
Figure 3:
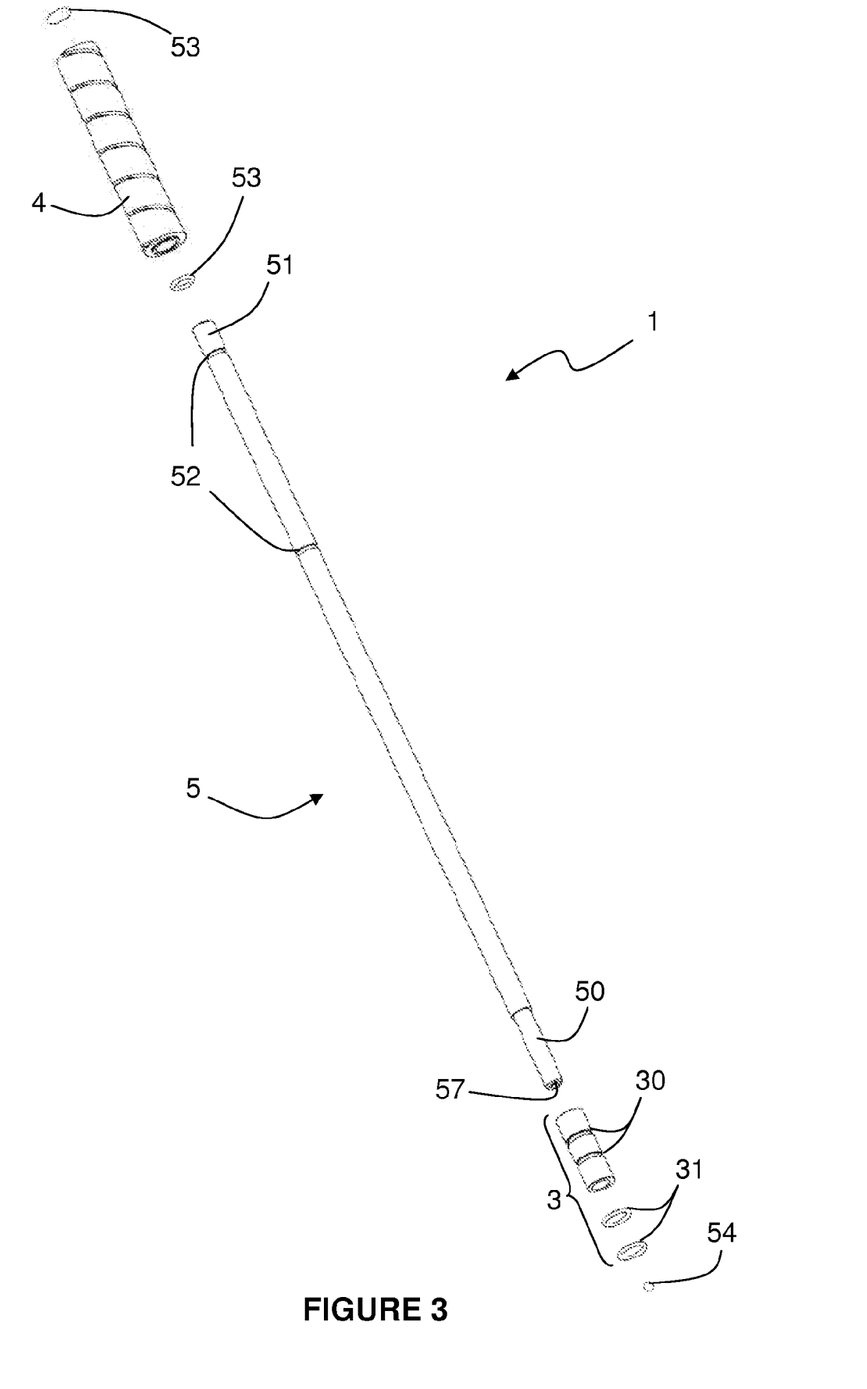
FIG. 3 is an exploded perspective view of the damping device of FIGS. 1 and 2.
Figure 4:
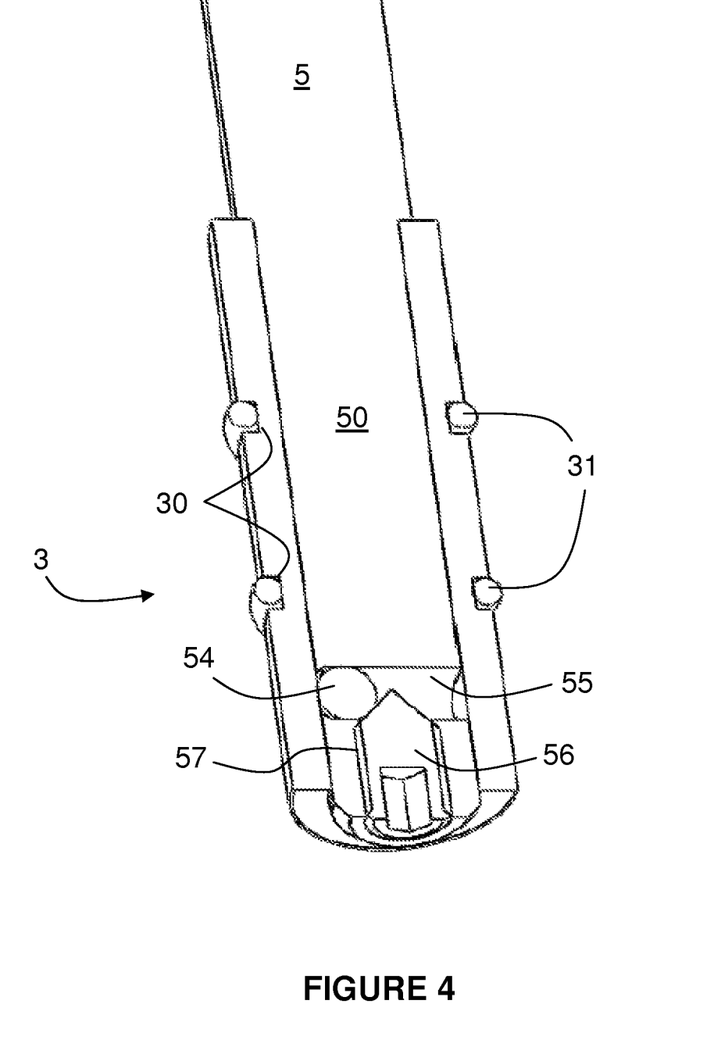
FIG. 4 is a perspective section view of the anchoring element and lock means of the damping device of FIGS. 1 to 3.

In use, the shaft 20 is first cleaned using a 410 barrel cleaning brush (not shown) to remove any dirt, rust, burrs or the like. The damping device 1 is then fitted into the shaft 20 of the putter 2 such that the anchor sleeve 3 is anchored in a lower, straight portion of the shaft 20, preferably at or adjacent the centre of gravity of the putter 2, while the damping sleeve 4 contacts an upper portion of the shaft 20 remote from the centre of gravity. The rod 5 therefore spans the centre of the shaft 20. This may be accomplished using a bespoke tool (not shown) that cooperates with the threaded end 51 to allow a fitter (not shown) to insert the device 1 into the open end of the shaft 20. It is also possible to use a small amount of grease (not shown) to facilitate insertion of the anchor sleeve 3 into the shaft 20. It has been observed that the damping device 1 of the invention remains secured properly despite the use of such grease.

The tool (not shown) is used to force the device 1 into the shaft 20 and preferably includes a graduated scale (not shown) indicating the depth of the device 1 within the shaft 20. It is envisaged that the fitter (not shown) would be provided with instructions as to what depth is required for the particular golf putter 2 being fitted.

In use when the putter 2 strikes a golf ball (not shown), the vibrations transferred from the head (not shown) of the putter 2 to the shaft 20 are then transferred into the rod 5, which oscillates in both a longitudinal direction (i.e. resulting in small transverse oscillations) and in a twisting direction along the shaft 20. The damping device 1 is configured such that these oscillations are partially absorbed by the damping sleeve 4 to reduce and/or regulate the vibrations, for example the amplitude and/or the frequency of the vibrations, running up the shaft 20 and into the golfer's hands. It has been observed that this arrangement also effectively increases the area of the sweet spot when the device 1 is configured and positioned correctly.

More specifically, if the foam layer 41 is too dense the vibrations will travel from the shaft 20 to the anchor sleeve 3 through the rod 5 through the damping element 4 and back into the shaft 20 with little effect. Moreover, if the foam layer 41 is not dense enough, the oscillations that pass into the rod will not be absorbed properly. The density of the foam layer 41 should therefore be selected to provide optimal damping whilst avoiding these two extremes. This is achieved by providing a damping sleeve 4 based on the specific design of the putter 2, wherein the degree of interference fit between the damping sleeve 4 and the putter 2 is preselected to achieve the desired result.

Referring now to FIGS. 5 to 12, there is shown a damping device 100 and installation tool 200 according to a second embodiment of the invention, which is similar to the damping device 1 of the first embodiment wherein like references depict like features that will not be described further. The damping device 100 according to this embodiment differs from that of the first embodiment in that the anchor element 103 is in the form of a split collet 130 filled with an elastomeric material, urethane rubber, and the damping element 104 includes a foam layer wrapped directly on the rod 105 and retained thereon by a pair of ferrules 140 and encased in shrink wrap to prevent damage or catching of the resilient material or layer when the device 100 is installed or removed.

Figures 5, 6, 7:
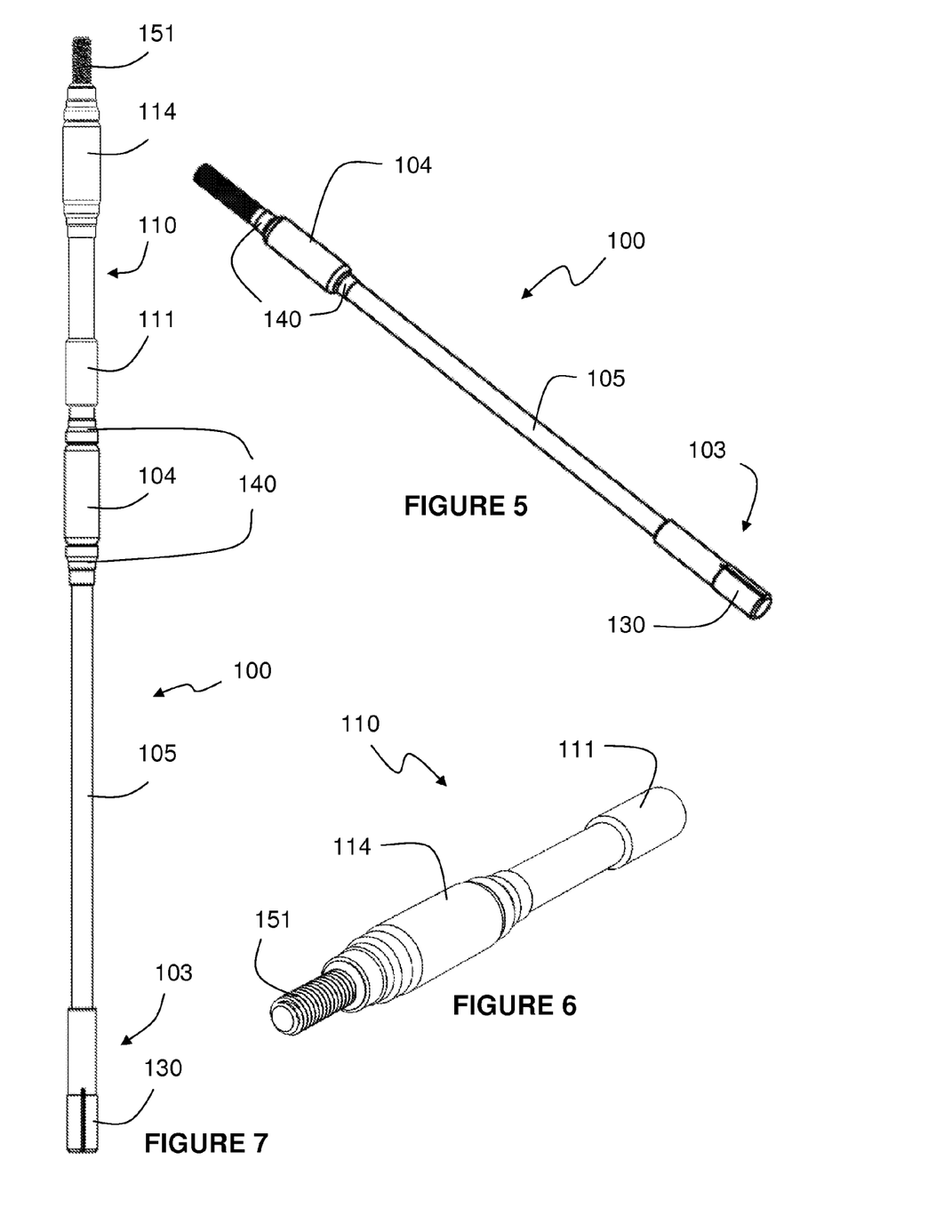
FIG. 5 is a perspective view of a damping device according to a second embodiment of the invention.
FIG. 6 is a perspective view of an optional damping extension for the damping device of FIG. 5.
FIG. 7 is a side view of the optional damping extension of FIG. 6 secured to the damping device of FIG. 5.
Figure 8:
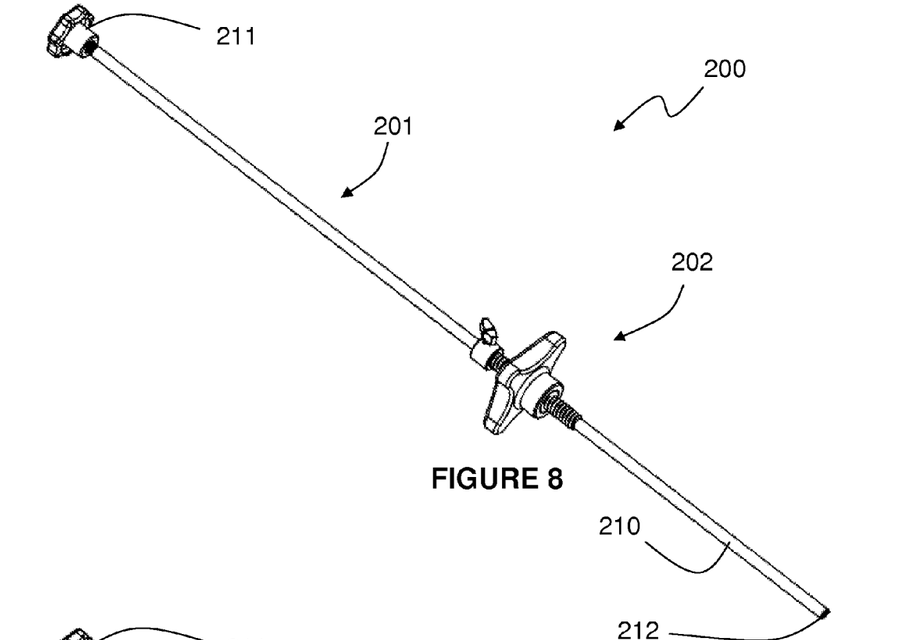
FIG. 8 is a perspective view of an installation tool for installing the damping device of FIG. 5.
Figure 9:
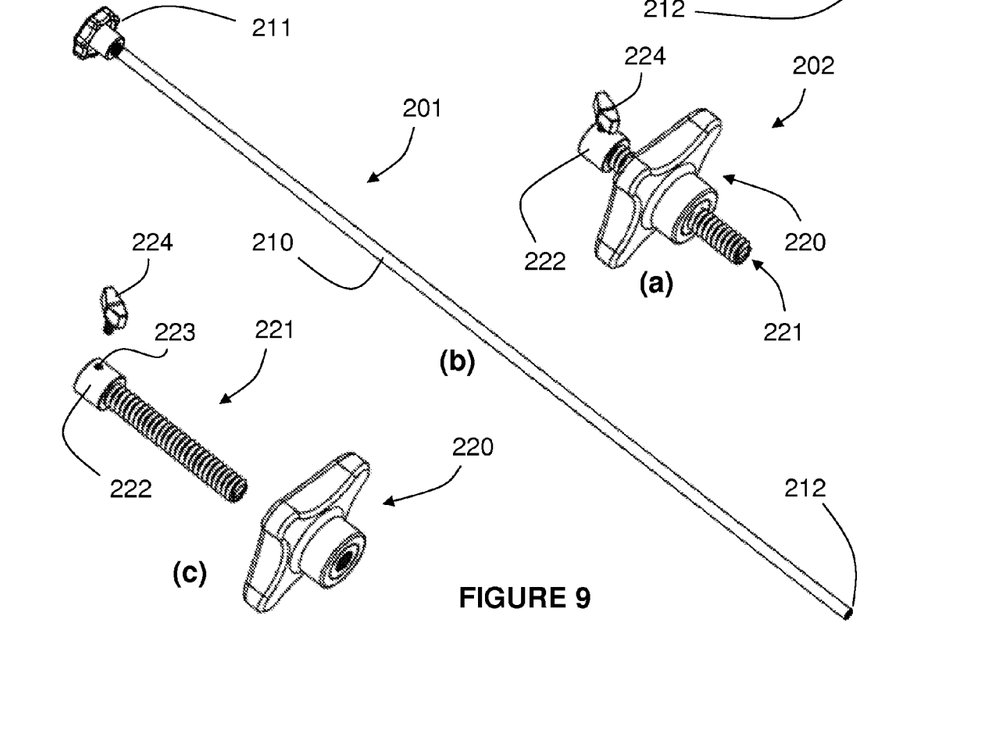

The elastomeric material enables repeated and/or resilient compression of the collet 130, thereby permitting the device 100 to lock into a greater tolerance of shaft diameters. The anchor element 103 is secured to the rod 105 by a threaded engagement (not shown) and extends beyond the end of the rod 105 to reduce the rigidity with which the rod 105 is secured and cantilevered to provide a further damping effect.

The damping device 100 also includes an optional damping extension 110 including a first end 111 with an internal thread for threaded engagement with the threaded portion 51 and, a second end with a further threaded portion 151 and a further damping element 114 similar to the damping element 104 of the damping device 100.

The installation tool 200 includes a shaft part 201, a movable adaptor 202 and a locator element 203. The shaft part 201 includes an elongate rod 210 with a first end carrying a handle 211 and a second end 212 with an internal thread for cooperation with the threaded portion 51 of the device 100 or of the threaded portion 151 of the damping extension 110. The movable adaptor 202 includes a locator knob 220 and a hollow threaded body 221 with a collar 222 at one of its ends. The locator knob 220 has a central hole with an internal thread that cooperates with the thread of the body 221 for fine tune adjustment. The collar 222 of the threaded body 221 includes a threaded hole 223 that receives a wing screw 224 for abutting and securing to the rod 210 of the shaft part 201. The locator element 203 is substantially cuboid in shape with a channel 230, 231 along an opposed two of its sides. A first channel 230 is configured to receive an outer portion of the shaft 20 of the putter 2, while the second channel 231 is configured to receive and locate the damping element 104.

Figures 10, 11:
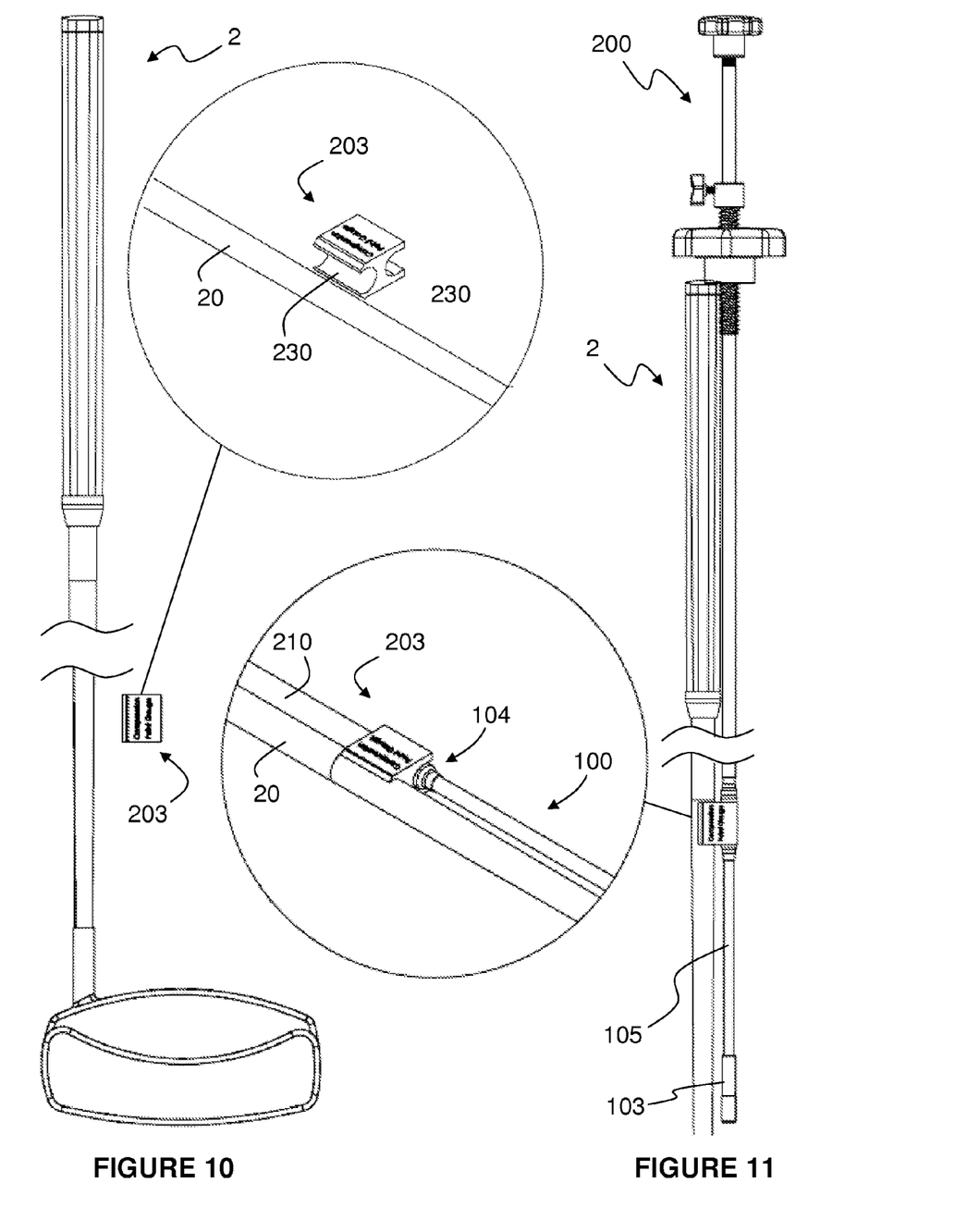
FIGS. 10 to 12 illustrate the use of the installation tool of FIG. 8 with a golf club.
Figure 12:
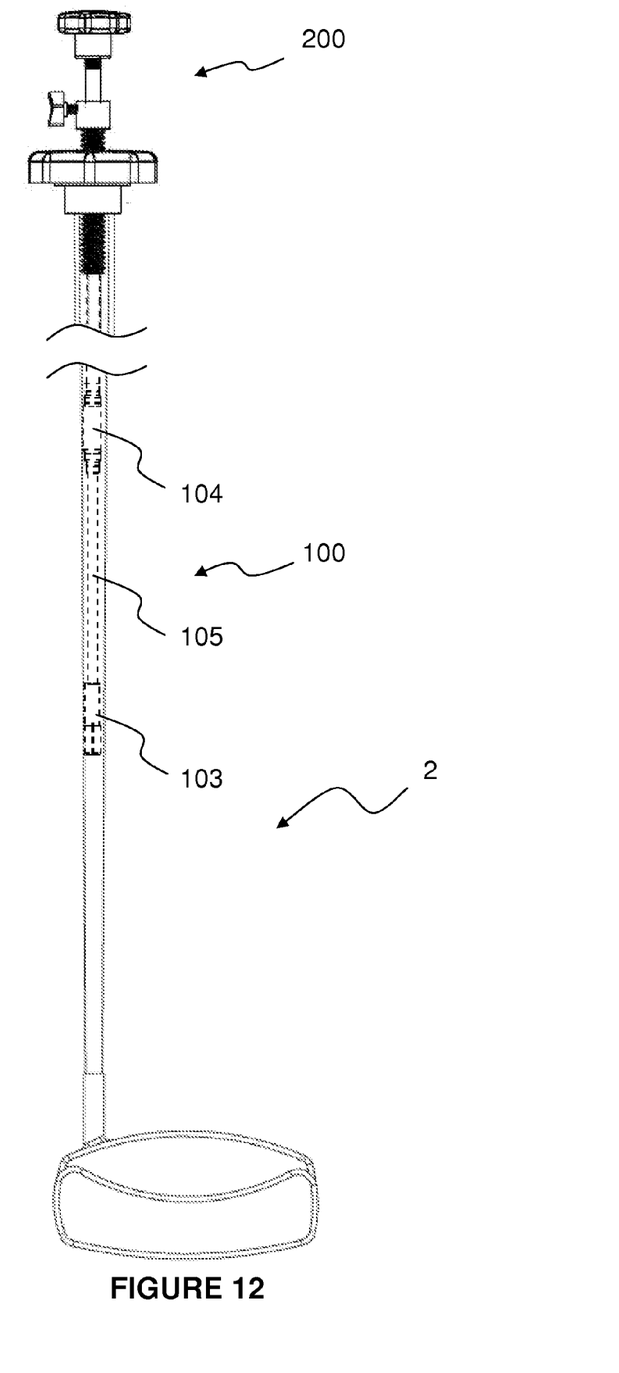

In use and with reference to FIGS. 10 to 12, the threaded end 51 of the damping device 100 is secured to the second end 212 of the shaft part 201 of the installation tool 200. The locator element 203 is then placed at the desired location on the shaft 20 and the damping element 104 is located in the second channel 231 of the locator element and the installation tool 200 is adjusted such that the base of the locator knob 220 abuts the top of the shaft 20. Preferably, the top of the grip on the shaft 20 is removed and it is also envisaged that the kit of the invention may be provided with a cap that may carry a logo or the like.

The device 100 is then inserted and forced into position until the bottom of the locator knob 220 abuts the top of the shaft 20. The wing screw 224 is then loosened and the movable adaptor 202 is pushed up the shaft part 201 and the handle 211 is turned to unscrew the second end 212 from the threaded portion 51 of the device 100 and the installation tool 200 is retracted.

It will be appreciated by those skilled in the art that several variations are envisaged without departing from the scope of the invention. For example, the configuration of the device 1, e.g. the choice of materials and/or geometry of the elements 3, 4 and/or rod 5, may be selected to increase the dead weight by more or less than 100 grams, for example by 25 or 35 or 50 grams or even 150 grams or more. Additionally or alternatively, the configuration of the device 1, e.g. the choice of materials and/or geometry and/or position of the device 1 and/or elements 3, 4 and/or rod 5, may be selected to move the centre of gravity of the putter 2 if this is required and/or desirable. Advantageously, the rod 5 may comprise a composite or carbon fibre material.

It will also be appreciated by those skilled in the art that any number of combinations of the aforementioned features and/or those shown in the appended drawings provide clear advantages over the prior art and are therefore within the scope of the invention described herein.

The invention claimed is:

1. A damping device for use in a golf club of a type having a shaft, comprising:
   a rod;
   an anchor element including a sleeve that receives a first end of the rod, said sleeve comprising a split collet defined by a slit running longitudinally along the sleeve which splits the split collet, and said split collet being filled with a resilient material to enable resilient compression thereof; and
   a damping element interconnected to said anchor element by said rod;
   said damping device having a section of recessed periphery, wherein the anchor element is sized and dimensioned to anchor, in use, by an interference fit the damping device within the shaft such that the damping element is in contact with an internal surface of the shaft to dampen vibrations therein.

2. Device according to claim 1, wherein the anchor element is configured substantially to cantilever the rod.

3. Device according to claim 1, wherein the sleeve is secured to the rod by a threaded engagement.

4. Device according to claim 1, wherein the sleeve extends beyond the end of the rod.

5. Device according, to claim 4, wherein the damping element comprises a foam covered by an outer layer.

6. Device according to claim 1, wherein the damping element is resilient.

7. Device according to claim 1, wherein the damping element is mounted to the rod between a pair of o-rings or ferrules.

* * * * *